C. H. MELVIN.
HAY PRESS.
APPLICATION FILED JULY 24, 1914.
1,147,743.
Patented July 27, 1915.
2 SHEETS—SHEET 1.
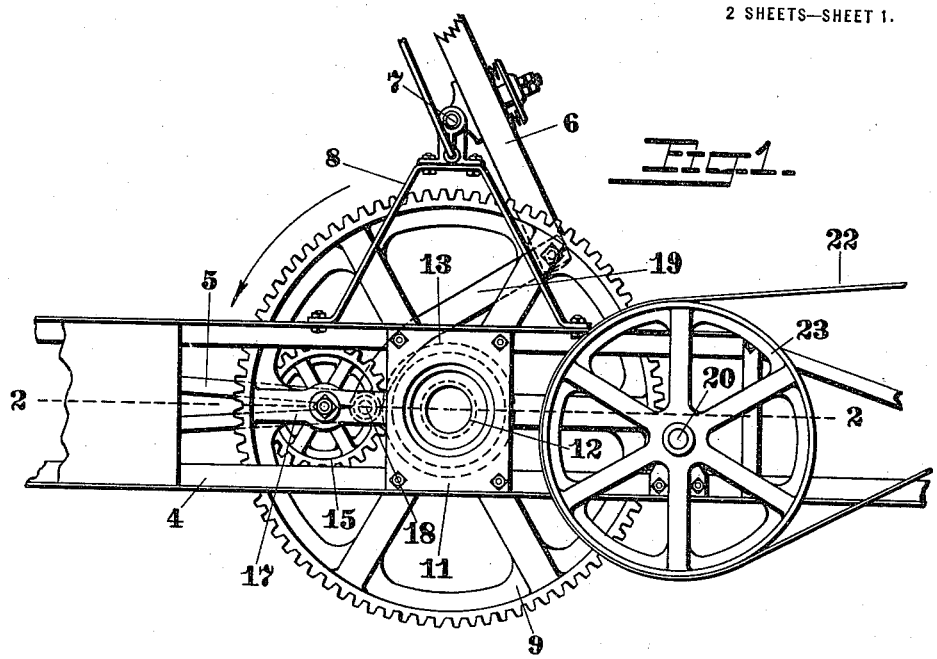
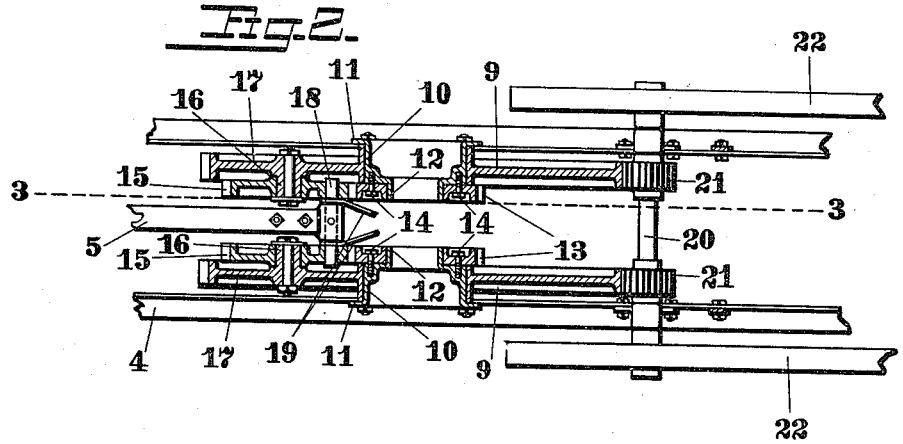
Witnesses:
M. A. Hunter
W. A. Furnner.
Inventor:
Charles H. Melvin,
Adams Jackson,
Attorneys.

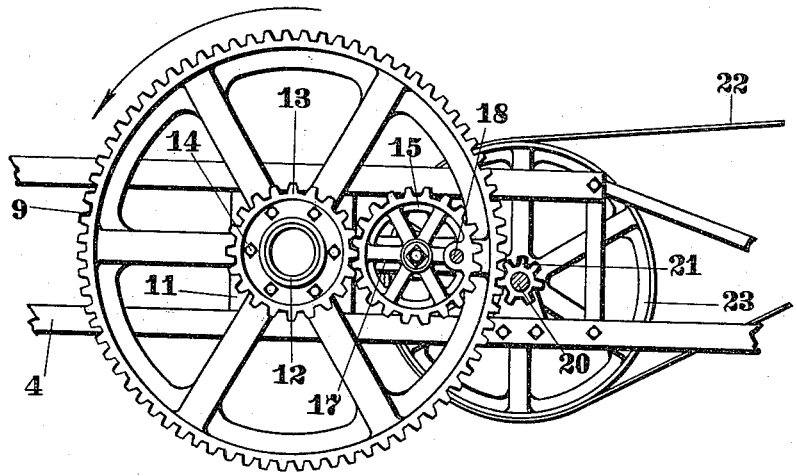

UNITED STATES PATENT OFFICE.

CHARLES H. MELVIN, OF MOLINE, ILLINOIS, ASSIGNOR TO DAIN MANUFACTURING COMPANY OF IOWA, OF OTTUMWA, IOWA, A CORPORATION OF IOWA.

HAY-PRESS.

1,147,743.   Specification of Letters Patent.   Patented July 27, 1915.

Application filed July 24, 1914. Serial No. 852,820.

*To all whom it may concern:*

Be it known that I, CHARLES H. MELVIN, a citizen of the United States, residing at Moline, in the county of Rock Island and State of Illinois, have invented certain new and useful Improvements in Hay-Presses, of which the following is a specification, reference being had to the accompanying drawings.

My invention relates to hay presses of the type shown and described in my pending application, Serial No. 843,405, filed June 6, 1914, in which the plunger is operated by gears in such manner as to give a slow speed and increased leverage to the plunger during its compression stroke and a greater speed during its idle stroke.

My present invention, like that of my said application, has for its object to provide a concentrically-mounted gear for operating the plunger of a hay-press in the manner indicated, and to operate such concentrically-mounted gear from a suitable source of power by a single gear reduction. I accomplish this object as illustrated in the drawings and as hereinafter described.

That which I regard as new is set forth in the claims.

In the accompanying drawings, in which I have shown only so much of a hay-press as is necessary to a full understanding of my invention, Figure 1 is a partial side elevation of a hay-press showing the drive gears and associated parts; Fig. 2 is a horizontal section on line 2—2 of Fig. 1; and Fig. 3 is a longitudinal vertical section on line 3—3 of Fig. 2.

Referring to the drawings,—4 indicates the usual hay-press frame, and 5 a part of the pitman or plunger by the reciprocation of which the hay is compressed in the usual baling-chamber.

6 indicates the usual beater-arm pivoted at 7 upon suitable standards 8 in the usual way.

9 indicates a main driving-gear, or gears, by which the plunger is reciprocated—two being usually employed. Said gears are circular and are pivotally mounted upon stationary central axes suitably supported by the side-bars of the frame 4. In the construction illustrated, 10 indicates the axes of the two gears, said axes being carried by side-plates 11 secured to the frame 4, as shown in Fig. 1. As best shown at 12 in Fig. 2, the axes 10 project inwardly beyond the surfaces of their respective gears 9 and carry pinions 13 which are fixedly secured to the respective axes by bolts 14, or other suitable means, so that they are held stationary.

15 indicates pinions of the same diameter as the pinions 13, which are pivotally mounted upon studs 16 carried by corresponding spokes 17 of the gears 9. The pinions 15 mesh with the pinions 13, as shown in Figs. 2 and 3. Thus, as the gears 9 rotate the pinions 15 will be carried by them around the axes 10, and by reason of their being in mesh with the stationary pinions 13, said pinions 15 will make two complete rotations about their own imaginary axes for each rotation of the gears 9, but as the studs 16 upon which the gears 15 rotate make one rotation during their revolution about the pinions 13, the gears 15 make but one rotation upon their respective studs during the same cycle. The plunger 5 is connected eccentrically with the pinions 15 by a wrist-pin 18 the ends of which are journaled in said pinions 15, as shown in Fig. 2; consequently, as the pinions 15 rotate and travel about the axis of the gears 9, the wrist-pin 18 will be moved toward and from the axis of said gears, thereby varying the speed and leverage of the plunger so as to operate the plunger with increased leverage and reduced speed on the compression stroke and to operate it at a greater speed though with reduced leverage on the idle stroke.

It will be understood, of course, that the parts are so adjusted that the wrist-pin 18 is at its nearest point to the axis of the gears 9 when the point of greatest compression is reached. The beater-arm 6 is also operated by the gears 9 through the pinions 15, since it is connected by an arm 19 with the wrist-pin 18, as shown in Figs. 1 and 2.

The gears 9 are driven from a drive-shaft 20 by pinions 21 mounted on said drive-shaft, as shown in Figs. 2 and 3, said drive-shaft, in turn, being driven by belts 22 running over pulleys 23 and driven from any suitable source of power, as by a gas engine mounted on the hay-press frame.

Figs. 1 and 2 show the position of the pinions 15 at the point of greatest compression, and as clearly illustrated therein, the wrist-pin 18 is then at its nearest point to the axes 10 of the drive-gears 9. Fig. 3 illustrates the position of the pinions 15 when the plunger is at the limit of its return stroke, and as there shown, the wrist-pin 18 is then at its greatest distance from the axes of the gears 9. It will be apparent, therefore, that when the parts are in the position shown in Fig. 3, as the gears 9 rotate in the direction indicated by the arrow in Fig. 3, the pinions 15 will be carried around the pinions 13 and will rotate contra-clockwise, carrying the wrist-pin 18 toward the axes of the gears 9 until when the parts reach the position shown in Fig. 1, the pinions 15 will have made one rotation about their own imaginary axes, and the wrist-pin 18 will then be at its nearest point to the axes of the gears 9, as shown. Thus the leverage of the drive-gears upon the plunger will gradually increase from the position shown in Fig. 3 to that shown in Fig. 1, while during the other half of the cycle the reverse will be true. During the latter half of the cycle, however, the speed of the plunger will gradually increase, owing to the movement of the wrist-pin toward the peripheries of the gears 9.

While my improved operating mechanism is intended primarily for baling presses, it may be used for operating the plungers of other types of presses, as well as in other analogous situations.

That which I claim as my invention, and desire to secure by Letters Patent, is,—

1. A baling-press, comprising a compressing member, a driving member mounted on a central axis for actuating said compressing member, and means for transmitting power from said driving member to said compressing member, comprising a rotary member mounted upon said driving member eccentrically thereof, means connecting said rotary member eccentrically with the compressing member, and means for rotating said rotary member as said driving member rotates.

2. A baling-press, comprising a compressing member, a driving member mounted on a central axis for actuating said compressing member, and means for transmitting power from said driving member to said compressing member comprising a rotary pinion mounted upon said driving member eccentrically thereof, means connecting said pinion eccentrically with the compressing member, and a stationary pinion for rotating said pinion as said driving member rotates.

3. A baling-press, comprising a compressing member, a centrally-mounted rotary gear, a stationary pinion mounted concentrically with said gear, and a pinion mounted on said gear eccentrically thereof and meshing with said stationary pinion, said compressing member being connected eccentrically with the pinion carried by said gear.

4. The combination of a reciprocating member, a driving member mounted on a central axis for actuating said reciprocating member, a rotary member mounted upon said driving member eccentrically thereof, means connecting said rotary member eccentrically with said reciprocating member, and means for rotating said rotary member as said driving member rotates.

5. The combination of a reciprocating member, a driving member mounted on a central axis for actuating said reciprocating member, a rotary gear mounted upon said driving member eccentrically thereof, means connecting said rotary gear eccentrically with said reciprocating member, and a stationary gear mounted concentrically with said driving member and meshing with said rotary gear.

CHARLES H. MELVIN.

Witnesses:
JESSIE SIMSER,
W. G. DUFFIELD.

Copies of this patent may be obtained for five cents each, by addressing the "Commissioner of Patents, Washington, D. C."